United States Patent
Gruendel et al.

(10) Patent No.: US 8,313,868 B2
(45) Date of Patent: Nov. 20, 2012

(54) OXYGEN ENRICHMENT DEVICE COMPRISING AT LEAST TWO MOLECULAR SIEVES FOR SUPPLYING A FUEL CELL SYSTEM

(75) Inventors: Harald Gruendel, Lueneburg (DE); Ralf-Henning Stolte, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 918 days.

(21) Appl. No.: 12/120,001

(22) Filed: May 13, 2008

(65) Prior Publication Data

US 2008/0213634 A1    Sep. 4, 2008

Related U.S. Application Data

(63) Continuation of application No. PCT/EP2006/011008, filed on Nov. 16, 2006.

(30) Foreign Application Priority Data

Nov. 17, 2005   (DE) .......................... 10 2005 054 888

(51) Int. Cl.
*H01M 8/06* (2006.01)
*B01D 50/00* (2006.01)

(52) U.S. Cl. ........ 429/410; 429/408; 429/443; 429/444; 422/170; 244/118.5

(58) Field of Classification Search .................. 429/408, 429/410, 412, 416, 443, 444, 411; 422/170, 422/187; 244/118.5; 423/235
See application file for complete search history.

(56) References Cited

U.S. PATENT DOCUMENTS

| | | | | |
|---|---|---|---|---|
| 5,925,322 | A | * | 7/1999 | Werth .......................... 422/170 |
| 2004/0043276 | A1 | * | 3/2004 | Hoffjann et al. ................ 429/34 |
| 2005/0031932 | A1 | | 2/2005 | Hu | |

FOREIGN PATENT DOCUMENTS

| | | |
|---|---|---|
| EP | 1357625 A2 | 10/2003 |
| WO | 2006058774 A2 | 6/2006 |

OTHER PUBLICATIONS

International Search Report for International Application No. PCT/EP2006/011008, mailed Feb. 28, 2007.

* cited by examiner

*Primary Examiner* — Raymond Alejandro
(74) *Attorney, Agent, or Firm* — Ingrassia Fisher & Lorenz P.C.

(57) ABSTRACT

A system is provided that combines an oxygen enrichment device (OBOGS) for generating oxygen-enriched air with a fuel cell system that includes, but is not limited to a fuel cell for using the oxygen-enriched air as a reaction gas within the fuel cell, as a result of which the output of the fuel cell is improved while the size and weight of the fuel cell remain the same.

11 Claims, 1 Drawing Sheet

OXYGEN ENRICHMENT DEVICE COMPRISING AT LEAST TWO MOLECULAR SIEVES FOR SUPPLYING A FUEL CELL SYSTEM

CROSS-REFERENCE TO RELATED APPLICATIONS

This is a continuation of International Application No. PCT/EP2006/011008, filed Nov. 16, 2006, which application claims the benefit of the filing date of German Patent Application No. 10 2005 054 888.1 filed Nov. 17, 2005 and of U.S. Provisional Patent Application No. 60/752,773 filed Dec. 20, 2005, the disclosure of which applications is hereby incorporated herein by reference.

TECHNICAL FIELD

The invention relates to a combination of an oxygen enrichment device with a fuel cell, in particular the combination of an on board oxygen generation system (OBOGS) with a fuel cell system within the technical system of an aircraft.

BACKGROUND

Hydrogen-operated fuel cells have relatively high operating efficiency both in full-load and in partial-load operation. However, fuel cell systems are associated with a disadvantage in that they become larger and heavier as the output requirements of the system increase.

SUMMARY

Thus, there may be a need to provide a possibility of improving the output of a fuel cell system while its size and weight remain the same. In addition, other improvements, desirable features, and characteristics will become apparent from the subsequent summary, detailed description, and the appended claims, taken in conjunction with the accompanying drawings and this background.

The system according to an exemplary embodiment of the invention combines an oxygen enrichment device for generating oxygen-enriched air in a fuel cell system comprising a fuel cell that uses oxygen-enriched air from the oxygen enrichment device as a reaction gas within the fuel cell.

According to an exemplary embodiment of the system according to the invention, the oxygen enrichment device is an on board oxygen generation system (OBOGS) that is supplied with air by way of an air supply source and that, by increasing the particle pressure of the oxygen in the air, increases the oxygen content in the air and conveys the oxygen-enriched air to the fuel cell system.

The OBOGS is an oxygen enrichment system that can, for example, be used in order to supply the cockpit of an aircraft with oxygen-enriched air, wherein the system is mechanically based, in contrast to the above-mentioned known oxygen-enrichment systems. Accordingly, the supply of oxygen is not limited to a period of time during which the chemical reaction takes place, as is the case in known oxygen enrichment systems, so that full-time operation of the system becomes possible.

The oxygen particle pressures of the OBOGS can be set to values between 60 and 94%.

The OBOGS can be supplied in various ways, for example by bleed air from an engine of an aircraft, by an air conditioning system, by outgoing or used air from the cabin and/or by an electrical compressor that compresses external air.

If the OBOGS is supplied by bleed air from the engines, in addition a pre-cooler is arranged upstream of the entire system because the bleed air leaves the engine at a temperature of approximately 220° C. (approximately 428 degree Fahrenheit), which may cause irreversible damage to the OBOGS. Direct coupling of the bleed air with the OBOGS/fuel cell combination does not require the use of an electrical compressor with a high parasitic output.

If supplying the OBOGS takes place by means of an air conditioning system, the air that supplies the OBOGS may be precisely conditioned. Direct coupling of the OBOGS to the air conditioning system makes it possible to supply the system during a reduction in cabin pressure. In this case of malfunction the OBOGS/fuel cell combination can continue to supply the full electrical output. Supplying the OBOGS with external air that has been compressed by an electrical compressor is the simplest solution from the point of view of specific system and regulation technology.

If cabin air is used to supply the OBOGS, no additional conditioning (radiators or the like) is required; the cabin air can be supplied directly to the OBOGS. When utilizing the cabin air for the OBOGS/fuel cell system, there is no need to provide either a pre-cooler or compressors, both of which devices are associated with high electrical consumption.

According to a further exemplary embodiment of the invention, the OBOGS comprises at least two molecular sieves for binding nitrogen and for letting oxygen through, with both nitrogen and oxygen being present in the air supplied by the air supply source. It is the function of these sieves to bind the nitrogen contained in the air by way of adhesion, and to let the oxygen pass, so that an increase in the oxygen particle pressure at the system outlet is created.

While one molecular sieve binds the nitrogen and lets the oxygen pass so as to generate the oxygen-enriched air, the other molecular sieve preferably uses this oxygen-enriched air from the one molecular sieve for its regeneration and in this way supplies nitrogen-enriched air to a further outlet of the OBOGS. It is thus easy to clean a molecular sieve that has been contaminated with nitrogen and to make the sieve available again for its normal filter operation.

According to an exemplary embodiment of the invention, the system comprises a sensor that registers the oxygen in the oxygen-enriched air that issues from one of the molecular sieves and, if a predetermined threshold value is not reached, switches operation of the molecular sieve that supplies oxygen-enriched air to regeneration operation, while at the same time regeneration operation of the other molecular sieve is switched to operation to bind nitrogen and to let oxygen pass.

According to another exemplary embodiment, the molecular sieves are zeolites.

According to another exemplary embodiment of the invention, the nitrogen-enriched air supplied by the OBOGS is used as an inert gas within a tank system and/or for nitrogen inerting the fuel cell system. The nitrogen is thus used as an inert gas within the tank system in order to prevent the creation of a potentially explosive mixture within the fuel tank. According to another option, the region in which the hydrogen tanks of the fuel cell system are integrated or the entire fuel cell system compartment is made inert with the use of nitrogen so as to eliminate any explosion hazard.

Nitrogen inerting can also be carried out for the kerosene tanks of the aircraft.

By arranging the OBOGS upstream of the fuel cell system, contamination of the fuel cells can be prevented because the zeolites filter out all impurities in the air. Thereby no reduction in the output of the fuel cells as a result of toxic effects is to be expected.

According to an exemplary embodiment the invention, the oxygen-enriched air is preferably fed as an educt gas into a cathode inlet of the fuel cell system, as a result of which the fuel cells are operated with more oxygen, which results in increased cell tension with identical operating parameters, and thus in a higher output. As a result of this increase in the output of the system, the design dimension and weight of the system can be reduced.

By increasing the partial pressure or particle pressure of the oxygen and thus by oxygen-enrichment of the air that is fed into the fuel cell, the U/i characteristic of the fuel cell is displaced upwards, wherein the increase in the output of the system at a current density of, for example, $i=0.6$ $A/cm^2$ and air enriched with oxygen (95%) is approximately 2.8% in relation to the efficiency.

BRIEF DESCRIPTION OF THE DRAWINGS

Below, with reference to the enclosed drawings an exemplary embodiment of the system according to the invention is described, and the same reference characters are used for identical or corresponding components in the following figures.

DETAILED DESCRIPTION

The following detailed description is merely exemplary in nature and is not intended to limit the invention or the application and uses of the invention. Furthermore, there is no intention to be bound by any theory presented in the preceding summary and background or the following detailed description.

Figures 1A, 1B:
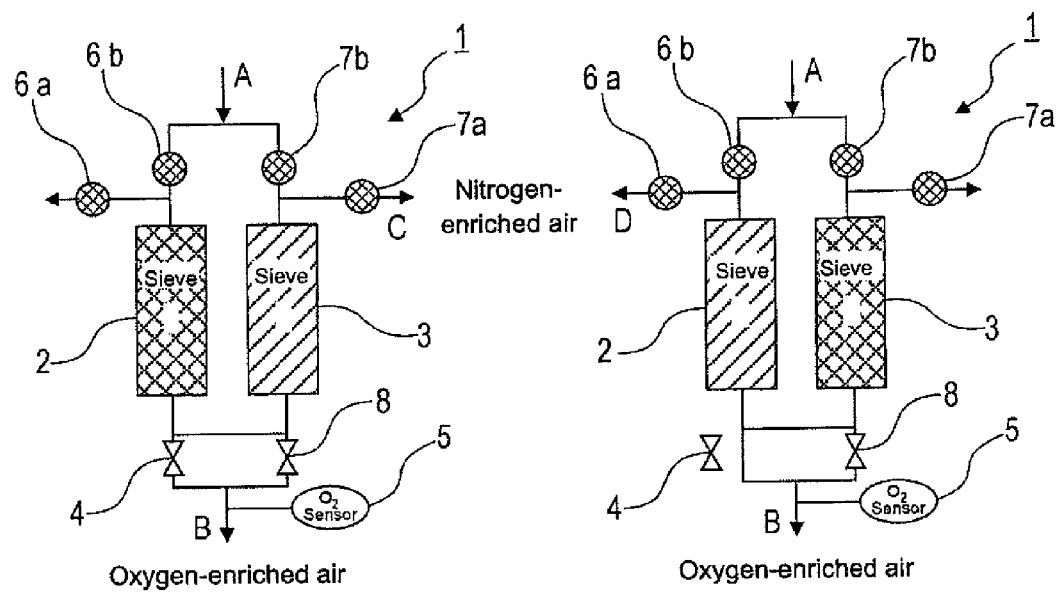
FIG. 1A shows a diagrammatic view of an oxygen enrichment system according to a preferred exemplary embodiment of the invention in a first operating state.
FIG. 1B shows the oxygen enrichment system according to FIG. 1A in a second operating state.

FIG. 1A shows an oxygen enrichment system which according to a preferred exemplary embodiment is an OBOGS as can be used in an aircraft.

As indicated by the arrow A, air is fed into the OBOGS 1. The air supplied to the OBOGS 1 is preferably bleed air from engines of an aircraft. The OBOGS 1 comprises, for example, two molecular sieves 2, 3. FIG. 1A shows an operating state in which oxygen production (enrichment) takes place by means of the molecular sieve 2. At the same time, the oxygen-enriched air from the molecular sieve 2 in the reverse current cleans a molecular sieve 3 that contains nitrogen contamination.

The molecular sieves 2, 3 are, for example, zeolite beds that remove nitrogen from the air, thus increasing the oxygen particle pressure.

In FIG. 1A, a valve 4 arranged downstream of the molecular sieve 2 is open so that the air that has been oxygen-enriched by means of the molecular sieve 2 can be output from the OBOGS 1 by way of the valve 4, as indicated by arrow B.

As shown in FIG. 1A the oxygen-enriched air from the molecular sieve 2 is also fed to the contaminated molecular sieve 3 so that the zeolite is cleaned. In this process the molecular sieve 3 generates nitrogen-enriched air, as indicated by arrow C.

In the operating state of the OBOGS as shown in FIG. 1A, the molecular sieve 2 absorbs nitrogen, while the molecular sieve 3 is engaged in a cleaning process.

As shown in FIG. 1A the OBOGS 1 further comprises control valves 6a, b and 7a, b that are arranged on the air-supply side from the air supply source.

In the operating state shown in FIG. 1A, the control valve 6b lets the air A coming from the supply source flow into the molecular sieve 2, while the control valve 7b prevents the air from flowing into the molecular sieve 3.

Furthermore, the control valve 6a is switched such that it does not let the air A pass. The control valve 7a is switched such that the oxygen-enriched air from the molecular sieve 3 is let out.

As shown in FIG. 1A, furthermore, there is a valve 8, switched in parallel to the valve 4, which valve 8 is preferably closed in this operating state of the OBOGS.

As shown in FIG. 1A, the OBOGS comprises a sensor 5 that senses the oxygen content of the oxygen-enriched air, and that, if a predetermined threshold value is not reached, initiates switchover of the valves 4, 8 and of the control valves 6, 7 such that the state shown in FIG. 1B is assumed.

As shown in FIG. 1B, the molecular sieve 2 is engaged in a cleaning process while the molecular sieve 3 absorbs nitrogen In FIG. 1B the control valve 7b is switched such that it allows an air flow into the molecular sieve 3, while the control valve 6b is switched such that it prevents any supply of air A into the molecular sieve 2. The control valve 7a is switched such that any output of air is prevented.

As shown in FIG. 1B, the oxygen-enriched air from the molecular sieve 3 is fed back to the molecular sieve 2 in order to clean the molecular sieve 2 that has become contaminated in operation according to FIG. 1A. The air D that is output by the molecular sieve 2 is nitrogen-enriched, wherein the nitrogen has been absorbed in the first operating state, as explained in conjunction with FIG. 1A.

In the operating state according to FIG. 1B the control valve 6a is switched such that the nitrogen-enriched air D from the molecular sieve 2 can be output from the OBOGS 1. The valve 8 is preferably open and the valve 4 closed.

In the operating state according to FIG. 1B the molecular sieve 3 thus performs the same function as does the molecular sieve 2 in the operating state according to FIG. 1A; and in the operating state according to FIG. 1B the molecular sieve 2 performs the same function as does the molecular sieve 3 in the operating state according to FIG. 1A.

Figure 2:
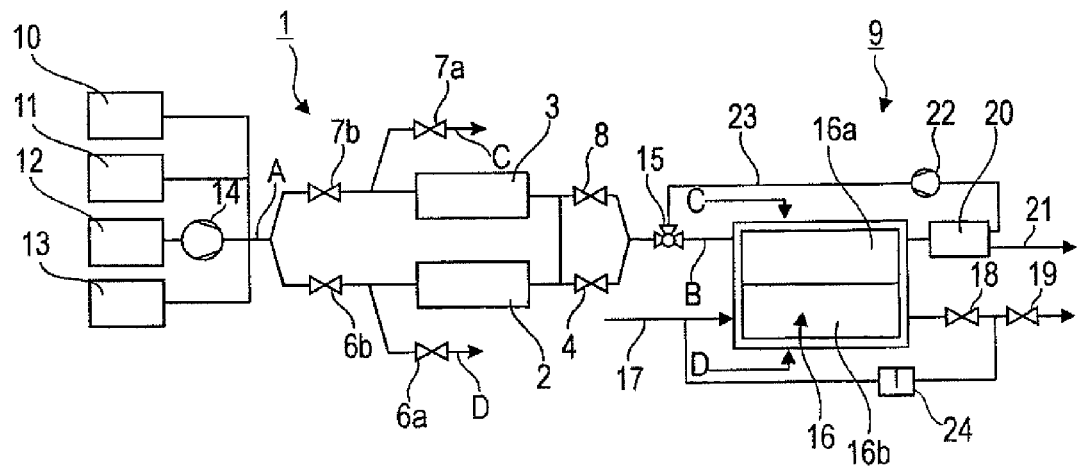
FIG. 2 shows the oxygen enrichment system according to FIG. 1 in combination with a fuel cell system according to an embodiment of the invention.

FIG. 2 shows the OBOGS 1 according to FIGS. 1A and 1B in combination with a fuel cell system 9 according to an embodiment of the invention.

As shown in FIG. 2, according to the preferred exemplary embodiment, the above-described OBOGS 1 can be supplied by various air supply sources 10, 11, 12, 13, of which four are shown by way of an example. The supply source 10 is, for example, bleed air from an engine of an aircraft. The air supply source 11 is, for example, air from an air conditioning system. The supply source 12 supplies, for example, external air that is compressed by an electrical compressor 14 arranged downstream. The air supply source 13 supplies, for example, normal outgoing air from the cabin. The air supply sources 10 to 13 can be operated separately or in combination with each other.

As shown in FIG. 2, the oxygen-enriched air that is generated by the OBOGS 1, as described above, is supplied to an air inlet 15 of the fuel cell system 9. According to the preferred exemplary embodiment, the fuel cell system 9 comprises a fuel cell 16 with a cathode side 16a and an anode side 16b. By way of an inlet 17, hydrogen in let into the fuel cell 16, and by way of a valve 18, as well as a hydrogen purge valve 19, the hydrogen is let out again.

As shown in FIG. 2, the fuel cell system 9 comprises a condenser 20, arranged downstream of the fuel cell 16, which condenser 20 lets water out by way of a water outlet 21 and delivers air back to the air inlet 15 of the fuel cell system 9 by way of an air compressor 22 and an air recirculation line.

As shown in FIG. 2, the fuel cell system 9 further comprises a condensate separator 24, whose inlet is connected to the hydrogen inlet 17 and whose outlet is connected between the valve 18 and the hydrogen purge valve 19. The fuel cell system 9 operates in a known manner.

According to an embodiment of the invention, nitrogen C, D is fed to the fuel cell system 9, either from the molecular sieve 2 or from the molecular sieve 3, for nitrogen inerting the compartment.

Although, above, the invention has been described with reference to a preferred exemplary embodiment, modifications and changes can of course be carried out without leaving the scope of the invention.

For example, it is possible to use several fuel cells in the fuel cell system. Furthermore, the OBOGS can comprise more than two molecular sieves, or all the molecular sieves can at the same time enrich the air with oxygen, wherein in this case the molecular sieves are cleaned in some other way, for example by the application of heat.

Although the invention has been described with reference to its use in an aircraft, the system can also be used elsewhere in order to improve the output of a fuel cell while the size and weight of fuel cell remain the same.

Moreover, while at least one exemplary embodiment has been presented in the foregoing detailed description, it should be appreciated that a vast number of variations exist. It should also be appreciated that the exemplary embodiment or exemplary embodiments are only examples, and are not intended to limit scope, applicability, or configuration in any way. Rather, the foregoing detailed description will provide those skilled in the art with a convenient road map for implementing an exemplary embodiment, it being understood that various changes may be made in the function and arrangement of elements described in an exemplary embodiment without departing from the scope set forth in the appended claims and their legal equivalents.

The invention claimed is:

1. A system, comprising:
  an oxygen enrichment device for generating oxygen-enriched air; and
  a fuel cell system with a fuel cell using the oxygen-enriched air as a reaction gas within the fuel cell;
  wherein the oxygen enrichment device is an on board oxygen generation system on board oxygen generation system which is supplied with air by a first air supply source, a second air supply source, and a third air supply source, and which, by increasing particle pressure of the oxygen in the air supplies the oxygen-enriched air to the fuel cell system;
  wherein the first air supply source supplies cooled bleed air from an engine of an aircraft to the on board oxygen generation system;
  wherein the second air supply source is an air conditioning system that supplies conditioned air to the on board oxygen generation system;
  wherein the third air supply source supplies outgoing air from a cabin to the on board oxygen generation system, the first, second, and third air supply sources in parallel arrangement and operable to supply air separately or in combination with each other.

2. The system of claim 1, wherein an air supply source supplies external air that has been compressed by an electrical compressor to the on board oxygen generation system.

3. The system of claim 1, wherein the on board oxygen generation system comprises at least two molecular sieves for binding nitrogen and for letting oxygen pass, with both nitrogen and oxygen being present in the air supplied by the at least one of the first air supply source, the second air supply source, and the third air supply source so that on a first outlet (B) of the on board oxygen generation system the oxygen-enriched air is supplied.

4. The system of claim 3, wherein alternately one molecular sieve of the at least two molecular sieves binds the nitrogen and lets the oxygen pass so as to generate the oxygen-enriched air, while the other molecular sieve of the at least two molecular sieves uses this oxygen-enriched air for its regeneration and supplies nitrogen-enriched air to a second outlet of the on board oxygen generation system.

5. The system of claim 3, comprising a sensor that detects the oxygen in the oxygen-enriched air and if said oxygen drops below a predetermined threshold value, changes operation of the at least two molecular sieves from the one molecular sieve to the other molecular sieve.

6. The system of claim 5, wherein the oxygen-enriched air is used as an inert gas within a tank system and/or for nitrogen inerting a compartment in the fuel cell system.

7. The system of claim 1, wherein the oxygen-enriched air generated by the oxygen enrichment device is fed as an educt gas into a cathode inlet of the fuel cell.

8. The system of claim 3, wherein at least one molecular sieve of the at least two molecular sieves is a zeolite.

9. The system of claim 1, wherein the on board oxygen generation system filters out impurities in the air supplied by the at least one of the first air supply source, the second air supply source, and the third air supply source so as to prevent contamination of the fuel cell.

10. A system, comprising:
  an oxygen enrichment device for generating oxygen-enriched air; and
  a fuel cell system with a fuel cell using the oxygen-enriched air as a reaction gas within the fuel cell;
  wherein the oxygen enrichment device is an on board oxygen generation system which is supplied with air by a first air supply source, a second air supply source, and a third air supply source, and which, by increasing particle pressure of the oxygen in the air supplies the oxygen-enriched air to the fuel cell system;
  wherein the first air supply source supplies cooled bleed air from an engine of an aircraft to the on board oxygen generation system;
  wherein the second air supply source is an air conditioning system that supplies conditioned air to the on board oxygen generation system; and
  wherein the third air supply source supplies outgoing air from a cabin to the on board oxygen generation system, the first, second, and third air supply sources in parallel arrangement and operable to each supply air through a different air supply path, either separately or in combination with each other.

11. A system, comprising:
  an oxygen enrichment device for generating oxygen-enriched air; and
  a fuel cell system with a fuel cell using the oxygen-enriched air as a reaction gas within the fuel cell;

wherein the oxygen enrichment device is an on board oxygen generation system which is supplied with air by a first air supply source, a second air supply source, and a third air supply source, and which, by increasing particle pressure of the oxygen in the air supplies the oxygen-enriched air to the fuel cell system;

wherein the first air supply source supplies cooled bleed air from an engine of an aircraft to the on board oxygen generation system;

wherein the second air supply source is an air conditioning system that supplies conditioned air to the on board oxygen generation system; and wherein the third air supply source supplies outgoing air from a cabin to the on board oxygen generation system, the first, second, and third air supply sources in parallel arrangement and operable in combination to each supply air through a different air supply path.

* * * * *